United States Patent
Goli et al.

(10) Patent No.: US 8,428,062 B2
(45) Date of Patent: Apr. 23, 2013

(54) NETWORK PROVIDER BRIDGE MMRP REGISTRATION SNOOPING

(75) Inventors: Sri Sairam Goli, San Jose, CA (US); CunZhi Lu, Milpitas, CA (US); Ramanarayanan Ramakrishnan, San Jose, CA (US); Ramasamy Ramanathan, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 573 days.

(21) Appl. No.: 12/706,260

(22) Filed: Feb. 16, 2010

(65) Prior Publication Data

US 2011/0200042 A1    Aug. 18, 2011

(51) Int. Cl.
  *H04L 12/56* (2006.01)
(52) U.S. Cl.
  USPC ............................................ 370/392; 370/401
(58) Field of Classification Search .................. None
  See application file for complete search history.

(56) References Cited

U.S. PATENT DOCUMENTS

| | | | | |
|---|---|---|---|---|
| 2007/0127459 A1* | 6/2007 | Lo et al. | | 370/389 |
| 2007/0263554 A1* | 11/2007 | Finn | | 370/256 |
| 2009/0304007 A1* | 12/2009 | Tanaka et al. | | 370/395.53 |
| 2010/0074098 A1* | 3/2010 | Zeng et al. | | 370/217 |
| 2010/0284309 A1* | 11/2010 | Allan et al. | | 370/256 |
| 2010/0309811 A1* | 12/2010 | Tanaka et al. | | 370/253 |
| 2012/0028661 A1* | 2/2012 | Fang et al. | | 455/466 |

OTHER PUBLICATIONS

IEEE; "Virtual Bridged Local Area Networks" *IEEE Std 802.1Q-2005*; May 19, 2006, pp. 1-303.
IEEE; "Virtual Bridged Local Area Networks Amendment 7: Multiple Registration Protocol" *IEEE Std 802.1ak-2007*, Jun. 22, 2007, pp. 1-107.
IEEE; "Media Access Control (MAC) Bridges" *IEEE Std 802.1D-2004*; Jun. 9, 2004, pp. 1-269.

\* cited by examiner

*Primary Examiner* — Hassan Phillips
*Assistant Examiner* — Duc Duong
(74) *Attorney, Agent, or Firm* — Harrity & Harrity, LLP (57) ABSTRACT

A provider edge bridge in a service provider network receives multiple media access control (MAC) Registration Protocol (MMRP) registration messages from customer networks via tunnels. The provider edge bridge snoops the MMRP registration messages to obtain multicast MAC addresses from the registration messages, and tunnels the MMRP registration messages toward one or more other bridges. The provider edge bridge constructs multicast forwarding tables based on the multicast addresses obtained from snooping the MMRP registrations, and uses the multicast forwarding tables for forwarding data units from the provider edge bridge towards destinations.

21 Claims, 10 Drawing Sheets

NETWORK PROVIDER BRIDGE MMRP REGISTRATION SNOOPING

BACKGROUND

Institute for Electrical and Electronics Engineers (IEEE) standard 802.1Q is a virtual local area network (VLAN) tagging networking standard that allows multiple bridged networks to transparently share physical network links without any leakage of information between networks. IEEE standard 802.1Q includes the encapsulation protocol used to implement VLAN tagging over Ethernet networks, and defines the meaning of a VLAN with respect to bridging at the Media Access Control (MAC) layer. Multiple MAC Registration Protocol (MMRP) is a protocol used in IEEE standard 802.1Q-based customer networks to build multicast spanning trees which limit the multicast traffic to the interested parties. IEEE standard 802.1ak may be implemented in conjunction with MMRP to allow for dynamic registration and deregistration of VLANs on ports in a VLAN bridged network.

Generally, multiple 802.1Q networks of a single customer may be interconnected by an IEEE standard 802.1AD service provider core network. Existing 802.1AD service provider core networks, which connect 802.1Q customer networks, use peering or tunneling to handle customer layer 2 control traffic that transits between customer networks via the service provider core network. If tunneling is used to handle the customer layer 2 control traffic, customer MMRP registrations are transparently tunneled by the 802.1AD service provider core network so that the customer networks can maintain end-to-end multicast registrations. However, since the service provider core network is not participating in the customer MMRP registrations, customer multicast data units are unnecessarily flooded throughout the entire service provider core network. If peering is used to handle customer layer 2 control traffic, the service provide edge bridge participates in the customer MMRP registration, and converts the MMRP registrations from the customer VLAN (CVLAN) domain into the SVLAN assigned for that customer. This approach limits the flooding in the service provide core network but, since provider edge bridges are combining all MMRP registrations from multiple CVLANs into a single SVLAN, all of the CVLAN-based multicast trees in the customer network will converge into a single SVLAN-based multicast tree. The tunneling approach, therefore, does not utilize the customer network MMRP registrations in the service provider network thereby causing excessive flooding in the service provider network. The peering approach, however, solves the excessive flooding problem, but at the cost of interfering with the customer MMRP operations.

SUMMARY

In accordance with one embodiment, a method may include receiving multiple media access control (MAC) Registration Protocol (MMRP) messages at a bridge, connected to a service provider network, via tunnels. The method may further include snooping the MMRP messages to obtain multicast MAC addresses from the MMRP messages, and tunneling the MMRP messages toward one or more other bridges. The method may also include constructing multicast forwarding tables based on the multicast addresses obtained from snooping the MMRP messages, and using the multicast forwarding tables for forwarding data units towards destinations.

In another implementation, a network bridge may include a group of ports to snoop registration messages, received via tunnels established with one or more other network bridges, to obtain multicast MAC addresses from the registration messages. The network bridge may further include a routing engine to construct multicast forwarding tables based on the multicast addresses obtained from snooping the registration messages, where the group of ports use the multicast forwarding tables for forwarding data units towards destinations.

In still another implementation, a bridge may include means for receiving multiple registration messages from customer networks via tunnels, and means for snooping the registration messages to obtain multicast MAC addresses from the registration messages. The bridge may further include means for tunneling the registration messages towards one or more other bridges and means for constructing multicast forwarding tables based on the multicast addresses obtained from snooping the registration messages. The bridge may also include means for using the multicast forwarding tables for forwarding data units from the provider edge bridge towards destinations.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein eliminate the excessive flooding of existing tunneling approaches and further does not interfere with customer MMRP operations as occurs with existing peering approaches. In exemplary embodiments described herein, each service provider edge bridge, and/or each service provider core bridge, tunnels customer MMRP registrations without any changes to the MMRP registrations. However, during the tunneling, the service provider edge bridge and/or service provider core bridge "snoops" (i.e., inspects) the customer MMRP registrations (i.e., MMRP Join requests) to obtain multicast MAC addresses that may be used to construct multicast forwarding tables. Furthermore, since the provider edge bridges and/or provider core bridges merely tunnel the customer MMRP registrations, the provider edge bridges and/or provider core bridges do not interfere with the customer MMRP operations. Since the provider edge bridges and/or provider core bridges are passively snooping on the MMRP registration requests, the provider edge bridges and/or provider core bridges are able to build SVLAN-based multicast distribution trees and thereby limit multicast flooding in the service provider core network. The multicast distribution trees may include a subset of bridges from a spanning tree. A spanning tree may include all of the bridges in the network, whereas the multicast distribution tree may include a subset of the bridges in the spanning tree that received multicast registration requests.

EXEMPLARY NETWORK

Figure 1A:
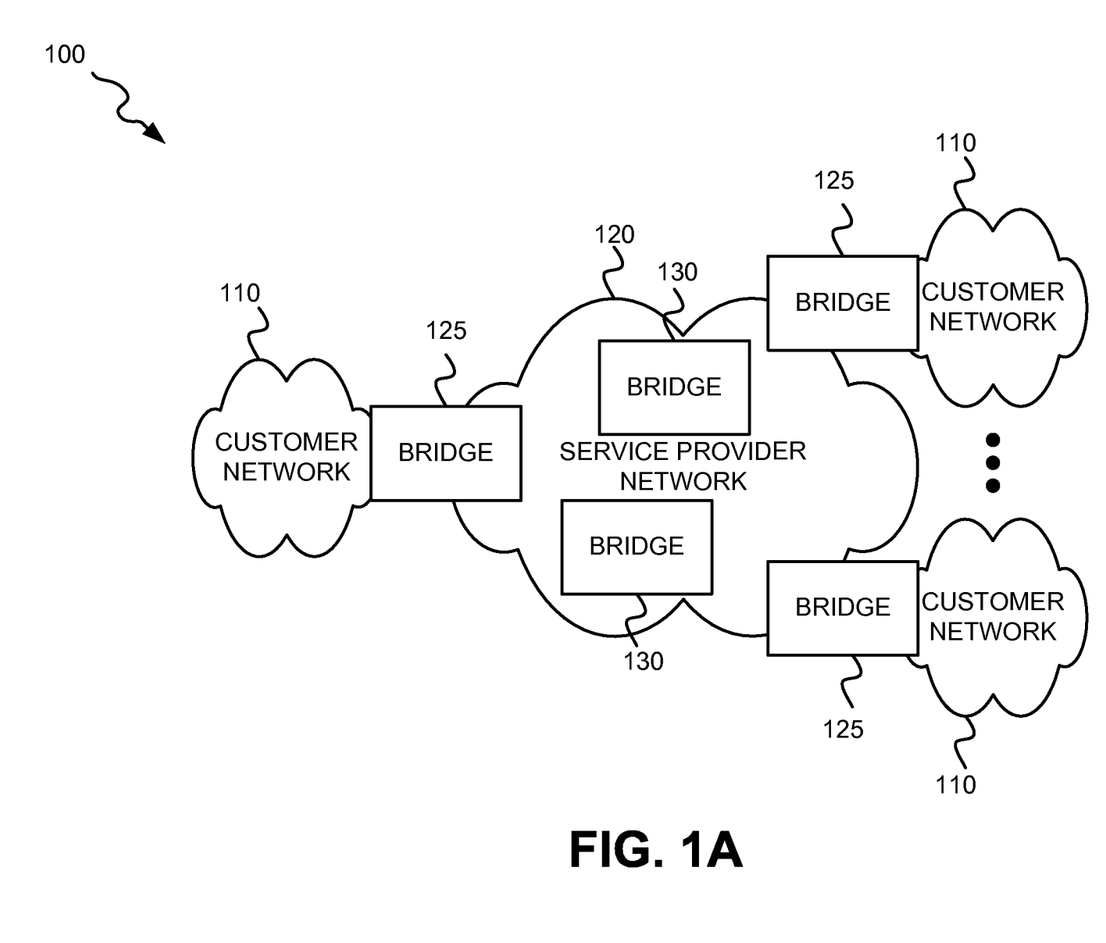
FIG. 1A depicts an exemplary network 100 in which network provider bridge MMRP registration snooping, as described herein, may be implemented.

FIG. 1A depicts an exemplary network 100 in which network provider bridge MMRP registration snooping, as described herein, may be implemented. Network 100 may be implemented as a Service Virtual Local Area Network (SVLAN). As shown in FIG. 1A, network 100 may include multiple customer networks 110 interconnected with a service provider network 120 via respective bridges 125. Bridges 125 may include bridges located on the edges of service provider network 120 (i.e., provider edge bridges). In one implementation, customer networks 110 may each include a site of a physical network operated by a customer, with each site connecting to a respective bridge 125 of service provider network 120. Customer networks 110 may implement, for example, IEEE standard 802.1Q. As further shown in FIG. 1A, service provider network 120 may further include one or more bridges 130. Bridges 130 may include bridges located within the core of service provider network 120 (i.e., provider core bridges). Customer networks 110 may each implement their own CVLAN.

Service provider network 120 may include a network operated by a service provider. Service provider network 120 may include a network of any type, including a local area network (LAN), a wide area network (WAN), a metropolitan area network (MAN), or the Internet. In one implementation, service provider network 120 may include an Ethernet network. Service provider network 120 may implement, for example, IEEE standard 802.1AD.

Each of bridges 125 and 130 may include a network bridge that may connect multiple network segments at the data link layer. Each of bridges 125 and 130 may perform bridging according to, for example, the IEEE standard 802.1D.

The components of network 100 depicted in FIG. 1A are exemplary. Network 100 may include fewer, additional, different and/or differently arranged components than are shown in FIG. 1A.

Figure 1B:
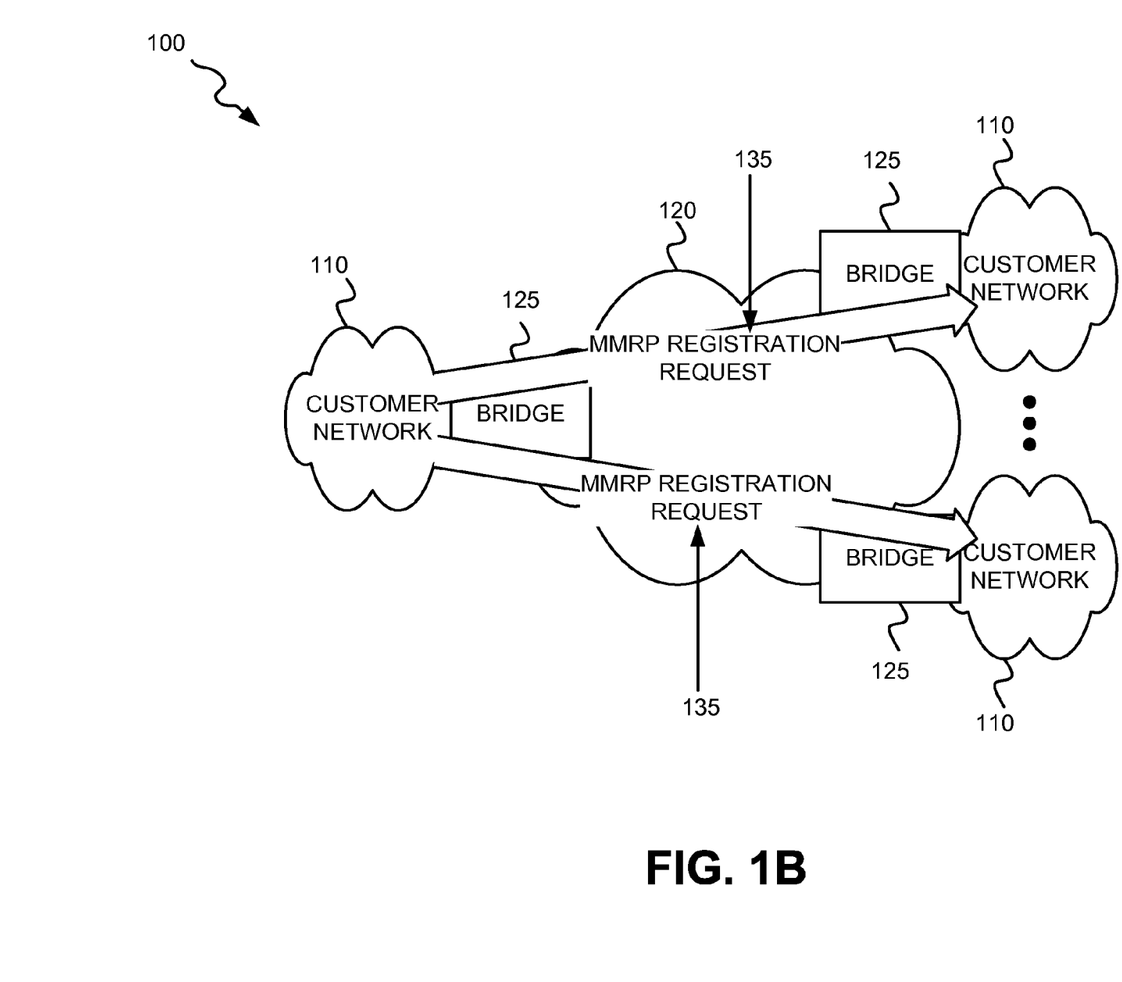
FIG. 1B further depicts the issuance of MMRP registration requests from a customer network, via a respective bridge and service provider network, to another customer network 110.

FIG. 1B further depicts the issuance of MMRP registration requests 135 from a customer network 110, via a respective bridge 125 and service provider network 120, to another customer network 110. A customer network 110 may register to participate in multicast forwarding by sending MMRP registration request messages to the other customer networks 110 via service provider network 120. Each of MMRP registration requests 135 may include, for example, a MMRP Bridge Protocol Data Unit (BPDU). Each customer network 110 may operate in the CVLAN domain, and each MMRP registration request 135, already having a CVLAN tag from customer network 110, may be tagged with a SVLAN identifier when the MMRP registration request 135 enters service provider network 120.

EXEMPLARY BRIDGE COMPONENTS

Figure 2:
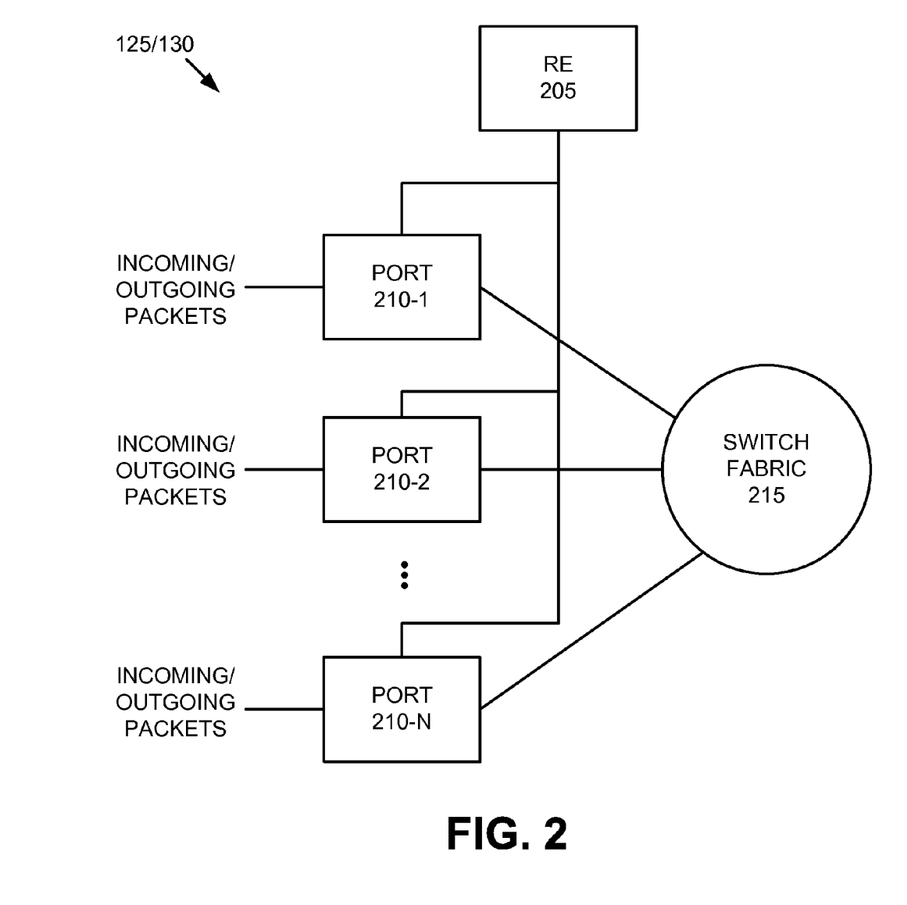
FIG. 2 is a diagram of a bridge of FIG. 1A or 1B in which MMRP registration snooping may be implemented.

FIG. 2 is a diagram of an exemplary bridge 125 or 130 in which MMRP registration snooping may be implemented. Bridge 125 or 130 may receive one or more data streams from a physical link, process the stream(s) to determine destination information, and transmit the stream(s) on one or more links in accordance with the destination information.

As shown, bridge 125 or 130 may include a routing engine (RE) 205, and multiple ports 210-1 through 210-N interconnected via a switch fabric 215. Switch fabric 215 may include one or more switching planes to facilitate communication between two or more of ports 210. In one implementation, each of the switching planes may include a three-stage switch of crossbar elements.

RE 205 may perform high-level management functions for bridge 125. For example, bridge 125 or 130 may communicate with networks and systems connected to bridge 125 or 130 to exchange information regarding network topology. RE 205 may construct SVLAN-based multicast trees, and may construct multicast forwarding tables based on the SVLAN-based multicast trees. In one implementation, RE 205 may construct a multicast distribution tree, and maintain a multicast forwarding table, for each SVLAN. In another implementation, RE 205 may construct a multicast distribution tree, and a multicast forwarding table, for each SVLAN and CVLAN pair. RE 205 send the multicast forwarding tables to respective ports 210. RE 205 may also perform other general control and monitoring functions for bridge 125 or 130.

Each port 210-1-210-N may connect to RE 205 and switch fabric 215. Each port 210-1-210-N may receive data units on physical links connected to a network, such as customer network 110 or service provider network 120. The data units may include packets, cells, or datagrams; fragments of packets, cells, or datagrams; or other types of data. Each physical link could be one of many types of transport media, such as, for example, Ethernet cable. Each port 210-1 through 210-N may include a packet forwarding engine (PFE) for forwarding incoming multicast data units towards appropriate destinations. Ports 210 may use the forwarding tables to perform multicast lookups for incoming multicast packets.

The components of bridge 125 or 130 depicted in FIG. 2 are exemplary. Bridge 125 or 130 may include fewer, additional, different and/or differently arranged components than are shown in FIG. 2.

BRIDGE FUNCTIONAL DIAGRAM

Figure 3:
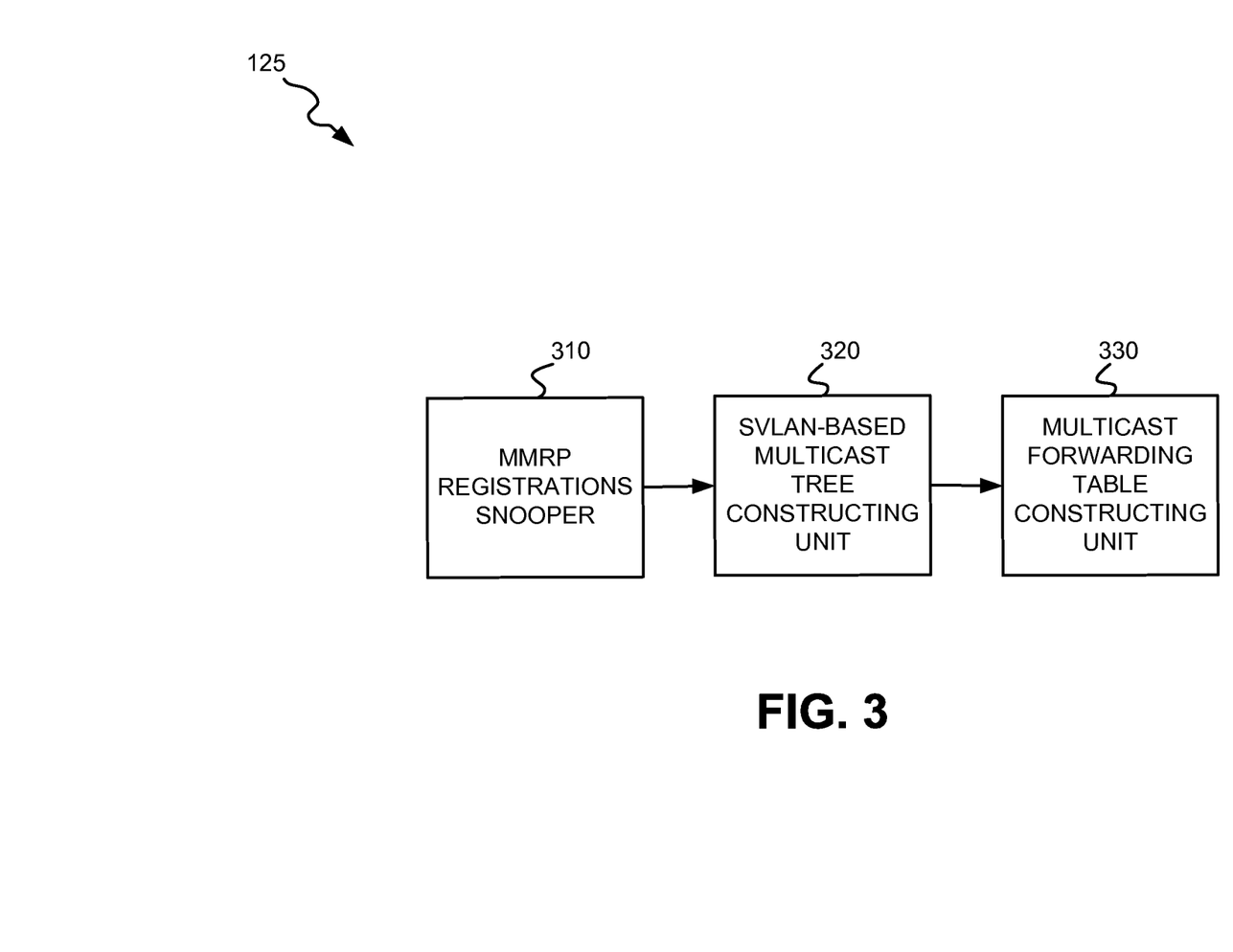
FIG. 3 is a diagram that depicts functions performed within a bridge of FIG. 1A or 1B.

FIG. 3 is a diagram that depicts exemplary functions performed within bridge 125 or 130. Bridge 125 or 130 may include a MMRP registrations snooper 310, a SVLAN-based multicast tree constructing unit 320, and a multicast forwarding table constructing unit 330. Each of the functional components depicted in FIG. 3 may be implemented by one or more of RE 205 or ports 210-1 through 210-N. In one implementation, for example, MMRP registrations snooper 310 may be implemented at each one of ports 210, and SVLAN-based multicast tree constructing unit 320 and multicast forwarding table constructing unit 330 may be implemented by RE 205.

MMRP registrations snooper 310 may inspect (i.e., "snoop") MMRP registration messages received via respective tunnels from customer networks 110 to obtain multicast addresses contained within the MMRP registrations. SVLAN-based multicast tree constructing unit 320 may construct multicast distribution trees, for each SVLAN, based on the multicast addresses obtained from snooping the MMRP registrations by snooper 310. SVLAN-based multicast tree constructing unit 320 may use existing MMRP techniques to construct a multicast distribution tree for each SVLAN or (SVLAN, CVLAN) pair based on the multicast MAC addresses received for each (SVLAN, CVLAN) pair.

Multicast forwarding table constructing unit 330 may use the multicast distribution trees constructed by SVLAN-based multicast tree constructing unit 320 to construct multicast forwarding tables. In one implementation, multicast forwarding table constructing unit 330 may construct a multicast forwarding table for each one of ports 210. Multicast forwarding table constructing unit 330 may use existing techniques to construct multicast forwarding tables based on the constructed SVLAN-based multicast distribution trees.

The functional components of bridge 125 or 130 depicted in FIG. 3 are exemplary. Bridge 125 or 130 may include fewer, additional, different and/or differently arranged functional components than are shown in FIG. 3.

EXEMPLARY MMRP REGISTRATION REQUEST

Figure 4:
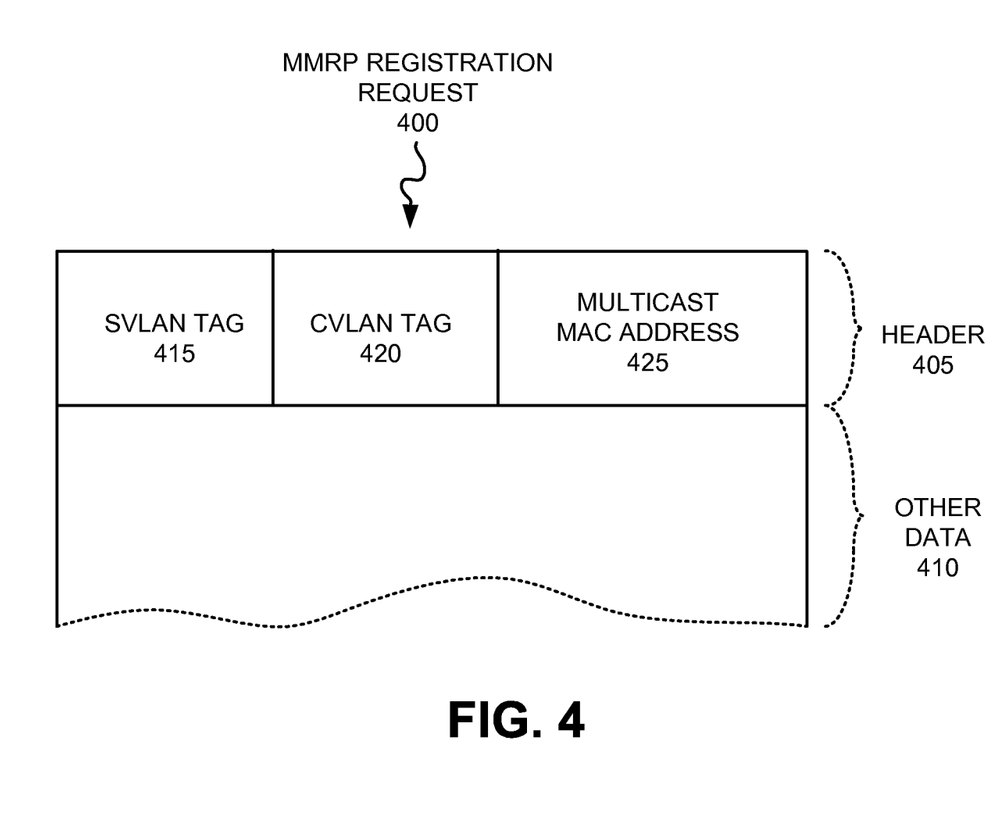
FIG. 4 is a diagram of an exemplary MMRP registration request that may be snooped at a bridge of FIG. 1A or 1B.

FIG. 4 is a diagram of an exemplary MMRP registration request 400 that may be sent from a customer network 110 across service provider network 120 to another customer network 110 for the purpose of, for example, registering for multicast data delivery. MMRP registration request 400 may correspond to MMRP registration request 135 depicted in FIG. 1B. MMRP registration request 400 may include a header 405 and other data 410. Header 405 may include a service VLAN tag 415, a CVLAN tag 420, and a multicast MAC address 425. Other data 410 may include other types of data used in MMRP registration, or for other purposes.

Service VLAN tag 415 may include a VLAN identifier that identifies a specific service VLAN to which the MMRP registration request belongs. CVLAN tag 420 may include a VLAN identifier that identifies a specific customer VLAN to which the MMRP registration belongs (i.e., request 400 originated from a customer network 110 identified by CVLAN tag 420). Multicast MAC address 425 may identify the multicast MAC address that is being registered for multicast flooding.

EXEMPLARY DATA UNIT

Figure 5:
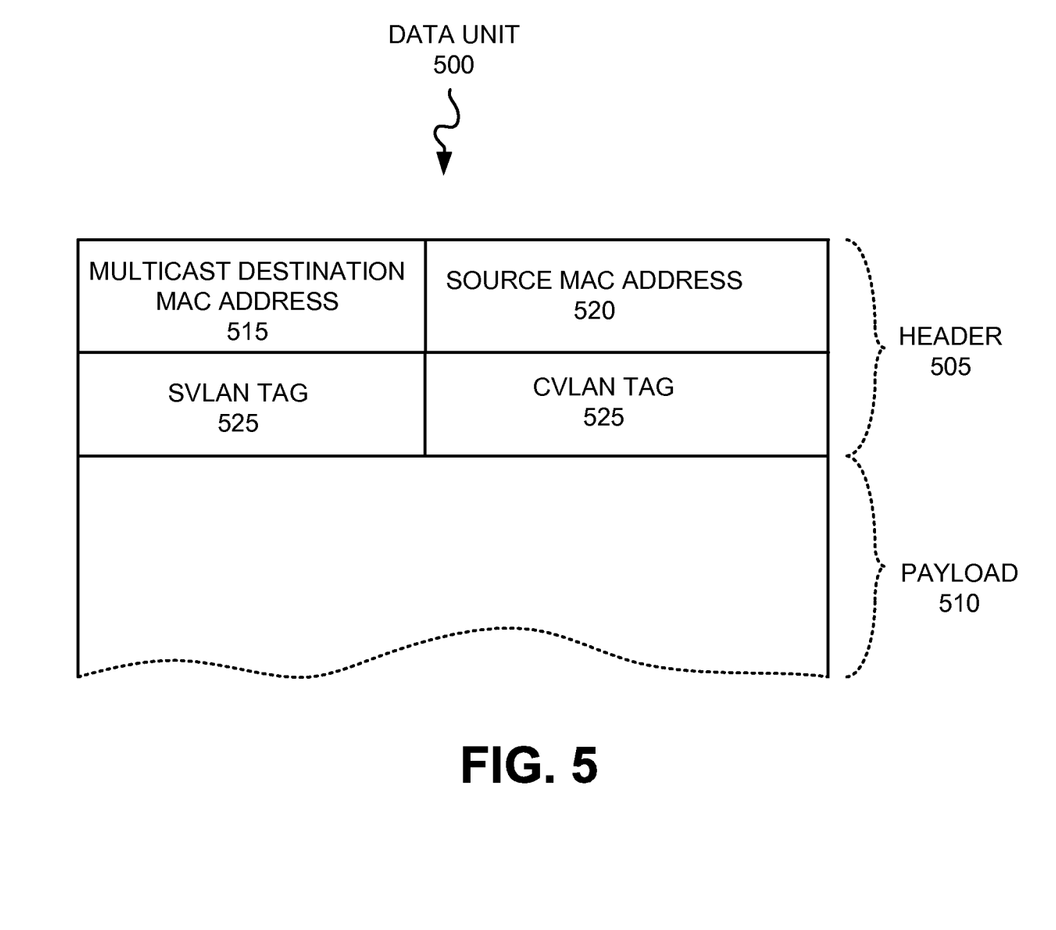
FIG. 5 is a diagram of an exemplary multicast data unit that may be received at a bridge of FIG. 1A or 1B.

FIG. 5 is a diagram of an exemplary data unit 500 that may be sent via a SVLAN from one customer network to another customer network to transmit payload data. Data unit 500 may include a header 505 and a payload 510. Header 505 may include a multicast destination MAC address 515, a source MAC address 515, a SVLAN tag 525, and a CVLAN tag 525. Payload 510 may include the payload data being transmitted by the data unit.

Multicast destination MAC address 515 may identify the MAC address that is the destination of data unit 500. Source MAC address 520 may include a MAC address of the node in customer network 110 that was the source of data unit 500. Service VLAN tag 525 may include a VLAN identifier that identifies a specific service VLAN to which data unit 500 belongs. CVLAN tag 525 may include a VLAN identifier that identifies a specific customer VLAN to which data unit 500 belongs.

MULTICAST FORWARDING TABLE

Figure 6:
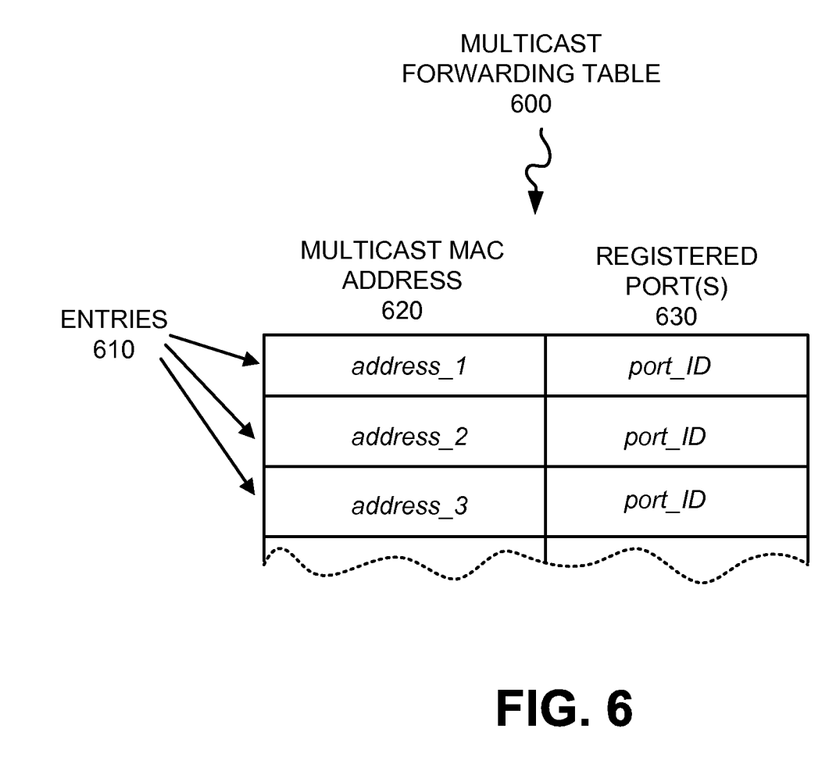
FIG. 6 is a diagram of an exemplary multicast forwarding table that may be used at a port of the bridge of FIG. 2 for flooding multicast data units.

FIG. 6 is a diagram of an exemplary multicast forwarding table 600. Multicast forwarding table 600 may include multiple entries 610, each of which may include a multicast MAC address field 620 and a registered port(s) field 630. Multicast MAC address field 620 may identify a multicast MAC address that has been registered (via a MMRP message) for multicast flooding. Registered port(s) 630 may identify one or more ports of bridge 125 or 130 through which a data unit that contains the multicast MAC address may be forwarded to reach the data unit's destination. Multicast forwarding table constructing unit 330 may construct table 600 for each port 210 of bridge 125.

The fields of table 600 depicted in FIG. 6 are exemplary. Table 600 may include fewer, additional, and/or different fields than are shown in FIG. 6. Table 600 may be maintained for each SVLAN or per each SVLAN/CVLAN pair.

EXEMPLARY BRIDGE MMRP SNOOPING PROCESS

Figure 7:
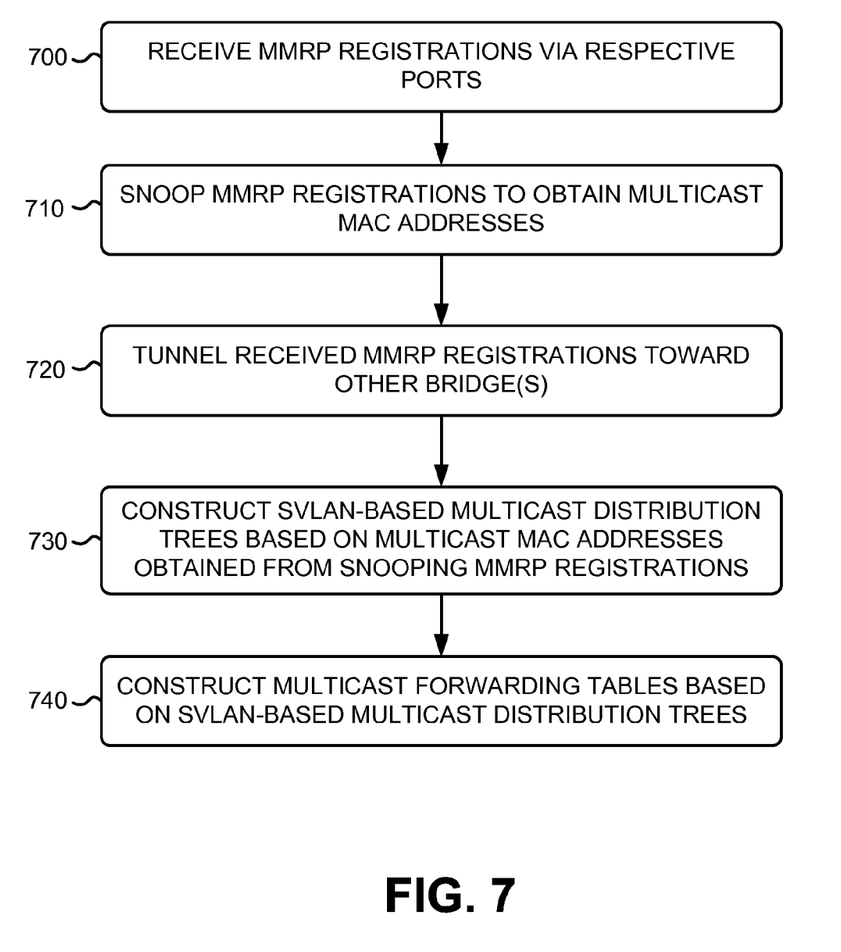
FIG. 7 is a flow chart that illustrates an exemplary process for snooping tunneled MMRP registrations.

FIG. 7 is a flow chart that illustrates an exemplary process for snooping tunneled MMRP registrations. The exemplary process of FIG. 7 may be implemented by bridge 125 or 130. The exemplary process of FIG. 7 may, thus, be implemented by a service provider edge bridge 125 or a service provider core bridge 130. The exemplary process of FIG. 7 is described below with reference to the exemplary messaging diagram of FIG. 8.

The exemplary process may include receiving MMRP registrations via respective ports of bridge 125 or 130 (block 700). For example, port 210 of bridge 125 or 130 may receive a MMRP registration and may pass the MMRP registration to MMRP registrations snooper 310. Referring to the exemplary messaging diagram of FIG. 8, MMRP registration request 400, which originated in a customer network 110, may be tunneled 810 via bridge 125 or 130 towards another customer network 110.

Figure 8:
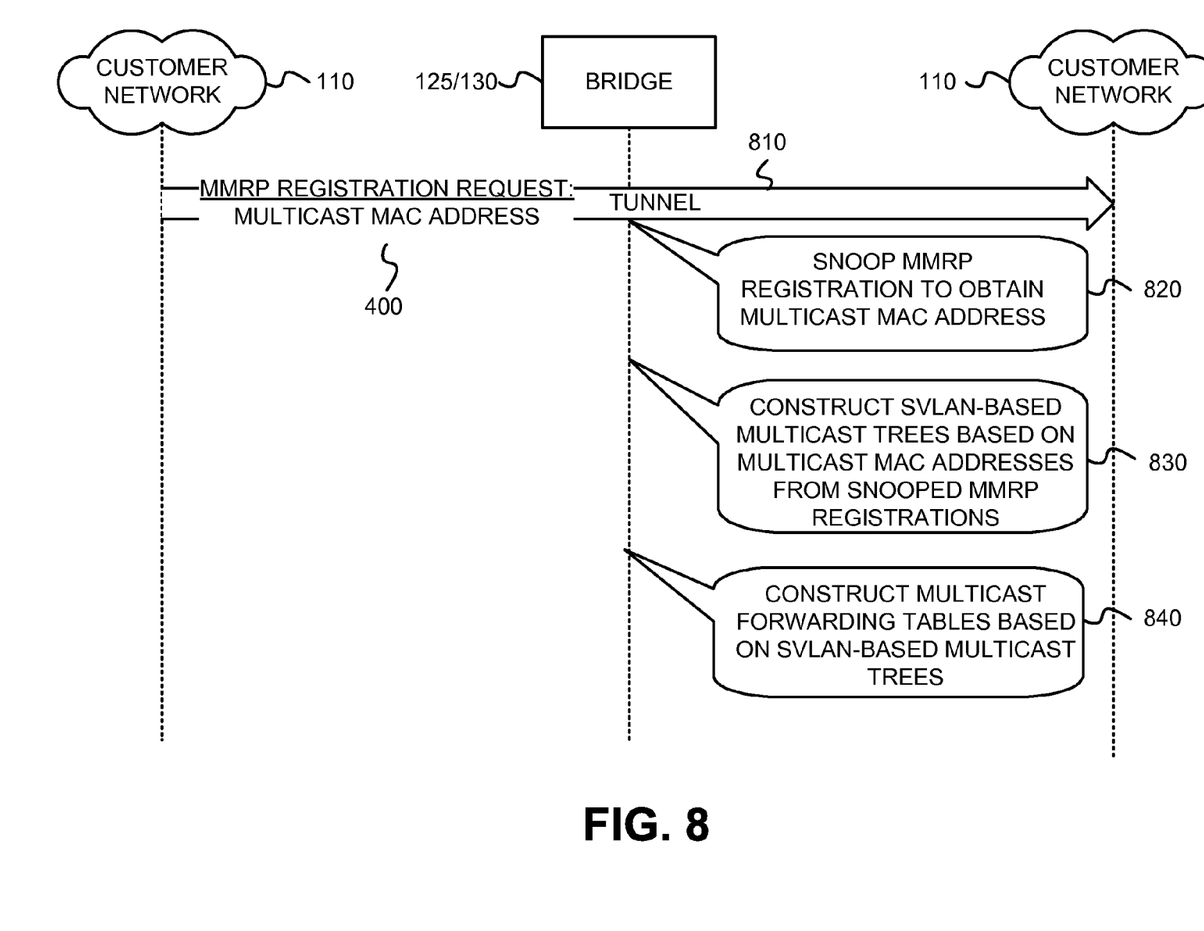
FIG. 8 is an exemplary messaging diagram that depicts MMRP registration snooping performed at a bridge of FIG. 1A or 1B.

The received MMRP registrations may be snooped to obtain multicast MAC addresses (block 710). For example, upon receipt of a MMRP registration at a port 210 of bridge 125 or 130, MMRP registrations snooper 310 may inspect the contents of the registration to obtain the multicast MAC address being registered. Referring to FIG. 8, as the encapsulated MMRP registration request message 400 is forwarded by bridge 125 or 130, MMRP registrations snooper 310 (not shown in FIG. 8) of bridge 125 or 130 may snoop 820 the contents of MMRP registration request 400 to obtain multicast MAC address 425 from header 405.

The received MMRP registrations may be tunneled toward other bridge(s) (block 720). For example, acting as a passive participant in the MMRP registration, port 210, which received the MMRP registration, may forward the encapsulated registration message via tunnel 810 (shown in FIG. 8) towards the other bridges connected to customer networks 110.

SVLAN-based multicast distribution trees may be constructed based on the multicast addresses obtained from snooping MMRP registrations (block 730). For example, in one implementation, SVLAN-based multicast tree constructing unit 320 may use existing spanning tree and MMRP techniques to construct a multicast distribution tree for each SVLAN based on the multicast MAC addresses received for each SVLAN. In another implementation, SVLAN-based multicast tree constructing unit 320 may use existing spanning tree and MMRP techniques to construct a multicast distribution tree for each SVLAN and CVLAN pair (i.e., for each SVLAN and CVLAN pair identified by SVLAN tag 415 and CVLAN tag 420 in received MMRP registrations requests 400). The multicast MAC addresses contained in multiple MMRP registration requests may be accumulated over time and used as a basis for constructing the SVLAN-based multicast distribution trees. Referring to FIG. 8, bridge 125 or 130 may construct 830 SVLAN-based multicast distribution trees based on the multicast addresses obtained from snooped MMRP registration messages.

Multicast forwarding tables may be constructed based on the SVLAN-based multicast distribution trees (block 740). For example, multicast forwarding table constructing unit 330 may use existing techniques to construct multicast forwarding tables based on the constructed SVLAN-based multicast distribution trees. Referring to FIG. 8, bridge 125 or 130 may construct 840 multicast forwarding tables 600 based on the SVLAN-based multicast distribution trees constructed in block 730. The constructed multicast forwarding tables may be used (described below with respect to FIG. 9) for flooding multicast data units to customer networks.

EXEMPLARY MULTICAST DATA UNIT FLOODING PROCESS

Figure 9:
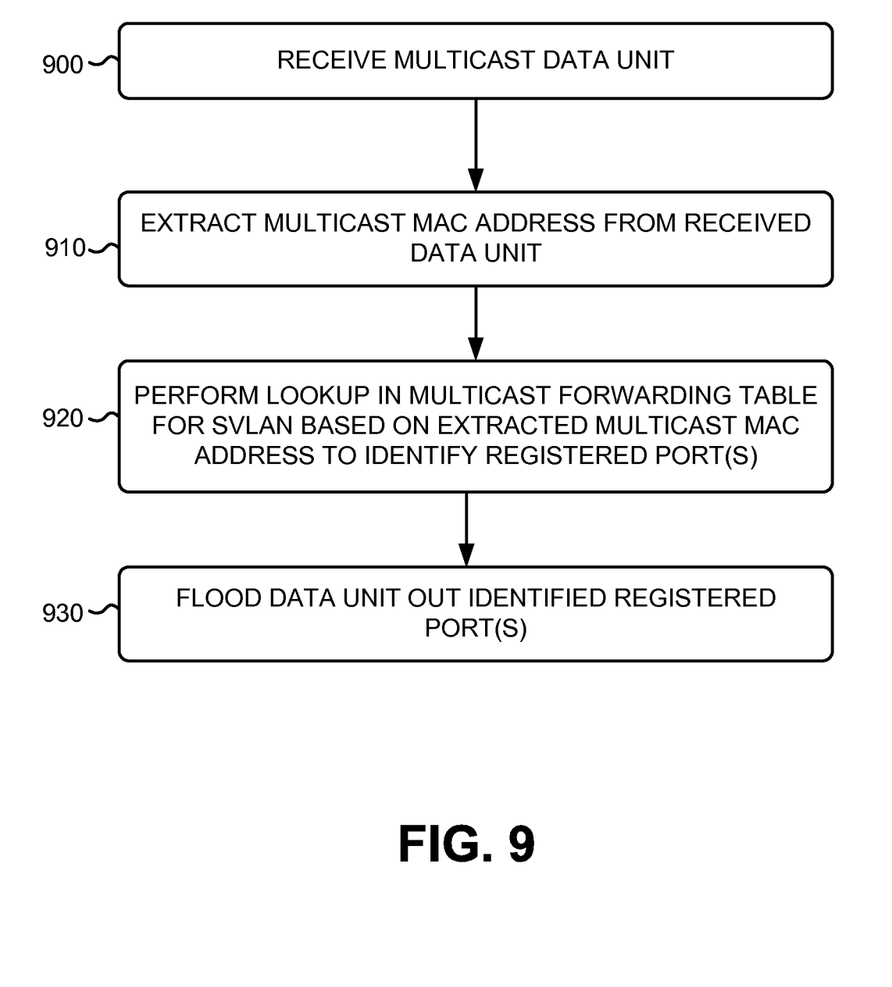
FIG. 9 is a flow chart that illustrates an exemplary process for flooding multicast data units.

FIG. 9 is a flow chart that illustrates an exemplary process for flooding a multicast data unit from a service provider bridge to multicast destinations. The exemplary process of FIG. 9 may be implemented by a port 210 of a bridge 125 or 130.

The exemplary process may include receiving a multicast data unit (block 900). For example, port 210 of bridge 125 or 130 may receive a multicast data unit 500 via a link (e.g., a link from customer network 110). A multicast MAC address may be extracted from the received data unit (block 910). For example, port 210 of bridge 125 or 130 may extract multicast MAC address 515 from header 505 of data unit 500.

A lookup may be performed in a multicast forwarding table for the SVLAN, based on the extracted multicast MAC address, to identify registered port(s) (block 920). For example, port 210 may extract service VLAN tag 525 from header 505 of data unit 500, and may then perform a lookup in the multicast forwarding table that corresponds to the extracted service VLAN tag. The lookup may include indexing the appropriate multicast forwarding table 600 to identify an entry 610 whose multicast MAC address 620 matches the multicast MAC address contained in the received data unit. The lookup may further include retrieving the registered port(s) 630 from the identified entry 610 of table 600. The data unit may be flooded out identified registered port(s) (block 930). For example, the receiving port 210 of bridge 125 or 130 may forward the data unit via switch fabric 215 for flooding out one or more registered ports identified in field 630 of the identified entry 610 of multicast forwarding table 600.

CONCLUSION

As described herein, snooping of MMRP registrations being tunneled via service provider bridges permits the provider bridges to obtain multicast MAC addresses that may be used for constructing multicast forwarding tables. The multicast forwarding tables may be used by provider edge bridges and/or provider core bridges for flooding multicast data units via a SVLAN towards destinations in customer networks.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While series of blocks have been described in FIGS. 7 and 9, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
   establishing, via a bridge connected to a service provider network, one or more tunnels between one or more customer networks and the service provider network;
   receiving, by the bridge, one or more media access control (MAC) Registration Protocol (MMRP) messages being transmitted via the one or more tunnels,
      the one or more MMRP messages being associated with a service virtual local area network (SVLAN) tag and one or more multicast MAC addresses;
   snooping, by the bridge, the one or more MMRP messages to obtain the one or more multicast MAC addresses associated with the one or more MMRP messages;
   constructing, by the bridge and based on the SVLAN tag, a multicast distribution tree,
      the multicast distribution tree being associated with a subset of bridges in a spanning tree to receive multicast registration requests;
   constructing, by the bridge, one or more multicast forwarding tables based on the multicast distribution trees and the one or more multicast MAC addresses obtained from snooping the one or more MMRP messages; and
   multicasting, by the bridge and based on the one or more multicast forwarding tables, one or more data units towards one or more destinations associated with the one or more multicast MAC addresses.

2. The method of claim 1, where the bridge includes:
   a provider edge bridge of the service provider network, or
   a provider core bridge of the service provider network.

3. The method of claim 1, where the one or more MMRP messages are received from the one or more customer networks.

4. The method of claim 1, where the one or more customer networks implement protocols associated with Institute for Electrical and Electronics Engineers (IEEE) standard 802.1Q.

5. The method of claim 1, where the service provider network implements protocols associated with Institute for Electrical and Electronics Engineers (IEEE) standard 802.1AD.

6. The method of claim 1, where constructing the one or more multicast forwarding tables further includes:
   associating, in the one or more multicast forwarding tables, a port, of a plurality of ports in the bridge, with each of the one or more multicast MAC addresses.

7. A device, comprising:
   at least one routing component to:

establish one or more tunnels between one or more customer networks and a service provider network associated with a network bridge, receive, at one or more of a plurality of ports and via the one or more tunnels, one or more registration messages, the one or more registration messages being associated with a service virtual local area network (SVLAN) tag and one or more multicast MAC addresses, forward, via the one or more tunnels, the one or more registration messages to one or more other network bridges, snoop, while forwarding the one or more registration messages, contents of the one or more registration messages to obtain the one or more multicast MAC addresses, construct, based on the SVLAN tag, a multicast distribution tree, the multicast distribution tree being associated with a subset of bridges in a spanning tree to receive multicast registration requests, construct one or more multicast forwarding tables based on the multicast distribution tree and the one or more multicast MAC addresses, forward, based on the one or more multicast forwarding tables, for forwarding data units towards destinations associated with the one or more multicast MAC addresses.

8. The device of claim 7, where the device comprises:
an edge bridge on the service provider network, or
a core bridge on the service provider network.

9. The device of claim 7, where the at least one routing component, when receiving the one or more registration messages, is further to:
receive the one or more registration messages at the plurality of ports from the one or more customer networks.

10. The device of claim 7, where the one or more registration messages comprise one or more Multiple Media Access Control (MAC) Registration Protocol (MMRP) messages.

11. The device of claim 7, where the one or more customer networks implement protocols associated with Institute for Electrical and Electronics Engineers (IEEE) standard 802.1Q.

12. The device method of claim 11, where the service provider network implements protocols associated with Institute for Electrical and Electronics Engineers (IEEE) standard 802.1AD.

13. The device of claim 7, where the at least one routing component, when constructing the one or more multicast forwarding tables, is further to:

associate a port, of the plurality of ports, with each of the one or more multicast MAC addresses.

14. A bridge comprising:
one or more ports to:
establish tunnels between one or more customer networks and a service provider network associated with the bridge, and
receive registration messages via the tunnels,
the registration messages being associated with a service virtual local area network (SVLAN) tag and multicast Media Access Control (MAC) addresses;
a snooping unit to process the registration messages to obtain the multicast MAC addresses from the registration messages;
a multicast tree constructing unit to:
construct, based on the SVLAN tag, at least one multicast distribution tree,
the at least one multicast distribution tree being associated with a subset of bridges in a spanning tree to receive multicast registration requests; and
a multicast forwarding table constructing unit to:
construct multicast forwarding tables based on the at least one multicast distribution tree and the multicast MAC addresses,
the one or more ports being further to:
use the multicast forwarding tables forward data units from the bridge towards destinations.

15. The bridge of claim 14, where the registration messages comprise multicast MAC Registration Protocol (MMRP) messages.

16. The bridge of claim 14, where the bridge operates as a provider edge bridge in the service provider network.

17. The bridge of claim 14, where the registration messages are received from the one or more customer network.

18. The bridge of claim 14, where the one or more customer networks implement protocols associated with Institute for Electrical and Electronics Engineers (IEEE) standard 802.1Q.

19. The bridge of claim 14, where the service provider network implements protocols associated with Institute for Electrical and Electronics Engineers (IEEE) standard 802.1AD.

20. The bridge of claim 14, where the bridge operates as a provider core bridge in the service provider network.

21. The bridge of claim 14, where the multicast forwarding table constructing unit is further to:
associate a port, of the one or more ports, with each of the one or more multicast MAC addresses.

* * * * *